United States Patent [19]
Pearce

[11] 3,940,667
[45] Feb. 24, 1976

[54] ELECTRICAL DEVICE AND METHOD OF MAKING THE SAME

[75] Inventor: Godfrey R. Pearce, Glasgow, Ky.

[73] Assignee: P. R. Mallory & Co. Inc., Indianapolis, Ind.

[22] Filed: Mar. 4, 1974

[21] Appl. No.: 447,974

[52] U.S. Cl. .............. 317/230; 252/62.3 Q; 29/570
[51] Int. Cl.² .......................................... H01G 9/00
[58] Field of Search ......... 317/230; 29/570; 357/72; 252/62.3

[56] References Cited
UNITED STATES PATENTS

| | | | |
|---|---|---|---|
| 1,886,997 | 11/1932 | Wilkins | 317/230 X |
| 2,062,543 | 12/1936 | Waterman | 317/230 X |
| 2,214,878 | 9/1940 | Clark | 317/230 |
| 2,321,997 | 6/1943 | Compton | 317/230 |
| 3,067,367 | 12/1962 | Ross | 317/230 |
| 3,098,182 | 7/1963 | Burnham | 317/230 |
| 3,411,122 | 11/1968 | Schiller et al. | 357/72 |
| 3,496,423 | 2/1970 | Ross | 317/230 |

*Primary Examiner*—Andrew J. James
*Attorney, Agent, or Firm*—Hoffmann, Meyer & Hanson

[57] ABSTRACT

In combination an electrode and a radiation semi-cured or completely cured polymer containing material suitable for use in an electrical device. The electrode includes a metal containing material. Contiguous to the metal containing material is a radiation semi-cured or completely cured polymer containing material. The semi-cured or completely cured polymer containing material retains electrolyte. The polymer containing material may contain a dielectric filler such as paper and the like.

A method of making the combination of the electrode and radiation semi-cured or completely cured polymer containing material including the steps of applying radiation curable polymer containing material to the electrode or to a dielectric filler to be used in the combination, irradiating applied material to semi-cure or completely cure the applied material and introducing electrolyte to the applied polymer containing material.

High energy irradiation from an energy source such as ultraviolet light or an electron beam is used to crosslink or cure polymeric material applied to the electrode.

11 Claims, 4 Drawing Figures

U.S. Patent    Feb. 24, 1976    3,940,667
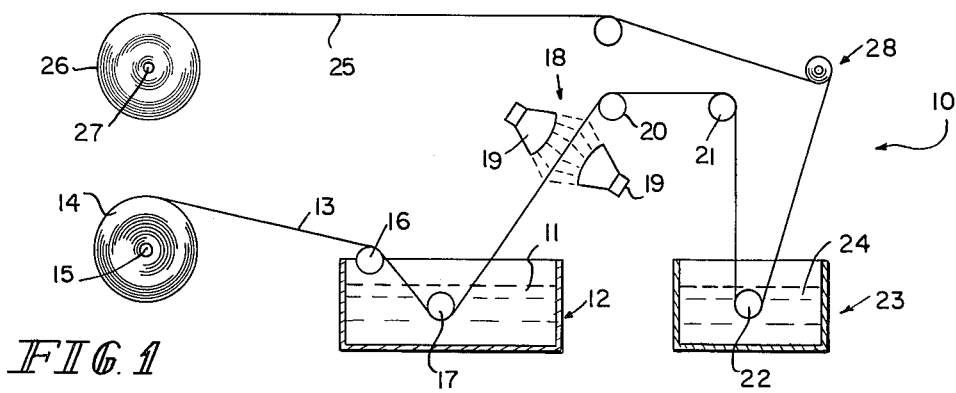
*FIG. 1*
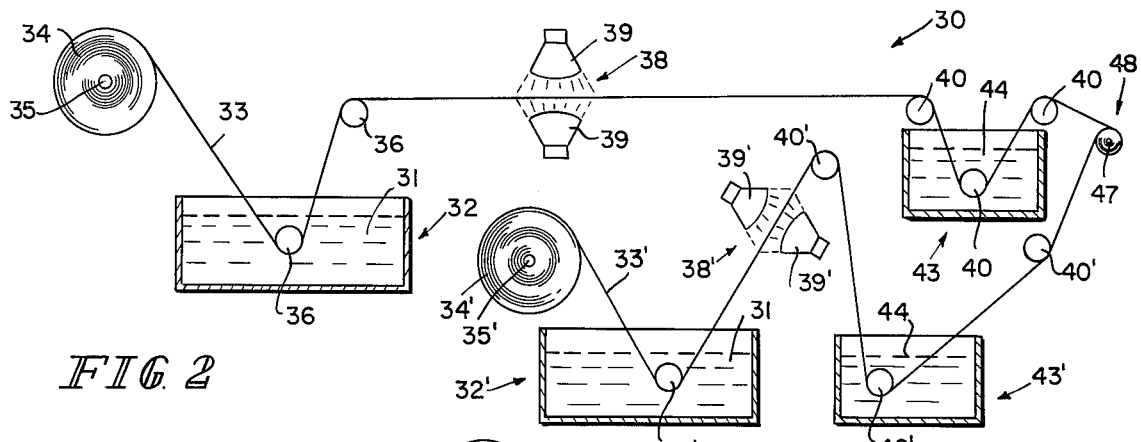
*FIG. 2*
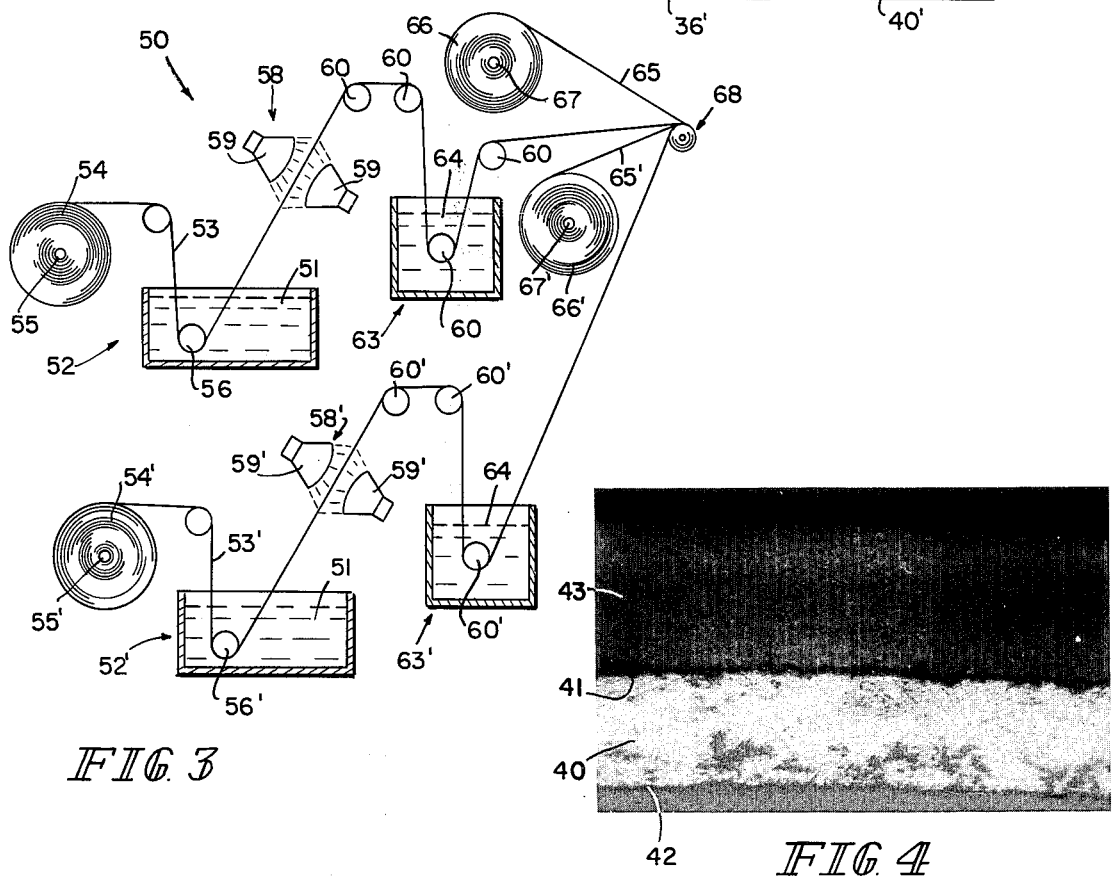
*FIG. 3*
*FIG. 4*

ELECTRICAL DEVICE AND METHOD OF MAKING THE SAME

The present invention relates to the combination of an electrode of metal containing material and a radiation semi-cured or completely cured polymer containing material, the material retaining an electrolyte, and to a method of making the same. More particularly, the invention relates an electrical device including an electrode of dielectric metal oxide forming metal contiguous to a radiation semi-cured or completely cured polymer containing material which polymer retains electrolyte, and to a method of making the same.

The component body of the electrical device may be any one of several component bodies such as a capacitor or a battery. The concepts of the present invention have particular applicability to an electrical device requiring the presence of a liquid electrolyte material.

A typical liquid type electrolytic capacitor includes an etched metal containing anode electrode foil such as aluminum or tantalum. The anode electrode foil may or may not have a dielectric oxide film formed over its surface. The cathode electrode is an etched metal containing foil which probably includes a dielectric oxide film formed over its surface. A layer or layers of paper such as Kraft paper are between the anode and cathode electrode foils. Typically, the anode and cathode electrode foils separated by the interleaved paper are convolutely wound into a relatively tight roll although a multiplicity of flat stacked electrode foils with interleaved paper has been used to provide a capacitor. The paper of the convolutely wound roll is impregnated, either before or after rolling, with a suitable electrolyte such as a solution of ammonium borate and boric acid, plus glycol to help lower the freezing point temperature of the solution. The impregnated convolutely wound roll is then inserted into the cavity of a substantially rigid housing. The housing helps to provide physical protection for the convolutely wound roll, and, just as importantly, to minimize contamination of the wound roll by contact with moisture and the like which may, during operation of the capacitor, have a harmful effect on the electrical characteristics of the liquid type electrolytic capacitor. Typically, the open end of the metal housing is sealed by either a glass-to-metal end seal or by an electrically insulating cap and seal. The end seal is retained by a suitable swaged or rolled-over edged portion of the housing and, if the end seal is of the glass-to-metal type, it is soldered to the swaged or rolled-over portion of the housing. Ideally, the housing for the capacitor body has its open end sealed in an atmosphere which is relatively free from harmful contaminants. Prior to sealing the open end of the housing, the housing is filled with electrolyte.

The use of paper to separate the anode and cathode electrode foils presents problems in proper alignment of the edges of the paper relative to edges of the electrode foils. Also, the character of the surface of the paper tends to have a harmful abrasive effect on the dielectric oxide film over the surface of the electrode foil contiguous to the surface of the paper. The paper separator tends to restrict the operation of the capacitor to about 125°C because the paper tends to become less pliable and looses its desired electrolyte absorbency characteristics at temperatures of about 125°C or higher. A paper type capacitor may require the use of multiple layers of paper to separate the anode and cathode means the proper distance and yet provide a medium which permits the necessary amount of electrolyte to be present between the anode and cathode electrode foils.

One aspect of the present invention relates to an electrode including a metal containing material and a radiation semi-cured or completely cured polymer containing material contiguous to the electrode with the polymer containing material retaining an electrolyte such as a solution of ammonium borate and boric acid with glycol. The polymeric material is cross-linked or cured by exposure to high energy irradiation such as ultra-violet (U.V.) light or electron beam (E.B.) irradiation. An advantage of radiation cured material over a solvent-base type material is the minimization of pollution of the atmosphere by solvent evolved during hardening since volatile solvents are not evolved into the atmosphere during radiation curing. Typically, volatile solvents are also highly combustible. Hardening solvent containing materials typically requires expending large amounts of heat in the use of ovens. The use of radiation cured material minimizes problems such as the alignment problem, the abrasive effect the surface of paper tends to have on the dielectric oxide film over the surface of the electrode foil, the restriction on the maximum upper operating temperature to about 125°C, and the separate and distinct layer problems usually associated with the use of paper. Furthermore, the polymer containing material provides a relatively thin medium to retain desired quantities of electrolyte between continuous anode and cathode electrodes.

It is therefore, a feature of the present invention to provide, in combination a radiation semi-cured or completely cured polymer containing material with electrolyte contiguous the electrode, and to a method of making the same. A further feature of the present invention is to provide a radiation semi-cured or completely cured polymer material, with or without filler, functioning as a spacer between contiguous anode and cathode electrodes and characterized by its ability to retain electrolyte. Other features of the invention will be apparent from the drawing, the following description and the appended claims.

IN THE DRAWING

FIG. 1 is a diagrammatic illustration of means for applying radiation cross-linkable polymer material to electrode strip, means for radiating the material applied to the electrode strip to cross-link or cure the material, means for immersing the electrode strip with the applied polymer material in a bath of liquid electrolyte, and means for winding the strip into a convolutely wound roll;

FIG. 2 is a diagrammatic illustration of means for applying radiation cross-linkable polymer material to separate electrode strips, means for radiating the material applied to the electrode strips to cross-link or cure the material, means for immersing the strip with the applied polymer material in a bath of liquid electrolyte, and means for winding the strips into a convolutely wound roll;

FIG. 3 is a diagrammatic illustration of means for applying radiation cross-linkable polymer material to separate paper strips, means for radiating the material applied to the paper strips, means for immersing the paper strips with the applied polymer material in a bath of liquid electrolyte, and means for winding the paper strips with electrode strips into a convolutely wound roll; and FIG. 4 is a 200 magnification cross-sectional view of an electrode strip with cured polymer material retaining electrolyte.

One form of the concepts embodied in the present invention is illustrated in FIG. 1. A means 10 is shown for applying and curing radiation curable material 11 from bath 12 to electrode foil 13. The application of the radiation curable material 11 to surfaces of the electrode foil 13 is accomplished by removing lengths of electrode foil from a foll 14 of electrode foil 13. Roll 14 is suitably carried by arbor 15. A length of electrode foil 13 to be treated is past over guide roller 16 and under guide roller 17 in bath 12. The electrode foil 13 is immersed in the radiation curable polymeric material 11 for the required length of time to apply desired amounts of material to immersed surfaces of the electrode foil 13. The viscosity of the radiation curable polymeric material may be varied to help control the thickness thereof applied to the electrode foil 13.

The electrode foil 13 is withdrawn from bath 12 and it together with the radiation curable material applied to its surfaces is passed through radiation cross-linking or curing zone 18. Zone 18 includes an ultraviolet light source 19 for causing cross-linking or curing of the material 11 applied to the surfaces of the foil electrode 13.

Electrode foil 13 with its cured material 11 is past over guide rollers 20 and 21 and under guide roller 22 in bath 23. The bath 23 contains liquid electrolyte 24. The electrode foil 13 with its cured polymer material is immersed in the electrolyte 24. Electrolyte 24 is retained by the cured material 11. Electrolyte 24 appears to be attracted into the cured polymer material 11 so that to the human eye the electrolyte retained by the cured polymer material seems to disappear physically.

The combination of the electrode foil 13 and the cured polymer material retaining electrolyte is convolutely wound with electrode foil 25 dispensed from electrode foil roll 26 carried by arbor 27. As shown in FIG. 1, electrode foil 25 does not have applied polymer material. A convolutely wound body 28, which includes a pair of electrode foil strips 13 and 25, cured polymer material 11 and electrolyte, is suitable for use as a capacitor body in an electrolytic capacitor.

The polymeric material 11 applied to the surfaces of electrode foil 13 is of the type which has a high degree of electrolyte retention upon curing and which does not have a harmful effect on the desired electrical and physical relationship between the electrolyte and electrode foil under operating conditions. Such a polymer material is marketed by W. R. GRACE & CO., Washington Research Center, 7379 Route 32, Columbia, Md., under type designation 5261A.

The radiation curable polymeric material 11 applied to the electrode foil 13 may be any one of several suitable radiation cross-linkable polymeric materials capable of retaining suitable amounts of electrolyte. For example, if ultraviolet light is used to cross-link the applied polymeric material, suitable materials may be unsaturated polyesters, thermosetting acrylics and urethane alkyds typically mixed with reactive monomers such as styrene, vinyl toluene, or acrylics, and a suitable initiator. In the event electron beam radiation is used to cross-link the applied polymeric material 12, suitable materials may be unsaturated polyesters, thermosetting and thermoplastic acrylics, urethanes and the like. It may be possible to modify the polyesters, acrylics and urethanes with epoxy, vinyl, silicone, fluorocarbon polymers and the like. Typical monomers may include styrene, vinyl toluene, acrylics and the like. In the use of an electron beam to cross-link the applied polymeric material 11, the electron beam bombards the polymer with a high energy electron.

FIG. 2 illustrates another embodiment of the present invention. A means 30 is shown for applying and curing radiation curable material 31 from baths 32 and 32' to a pair of electrode foils 33 and 33' respectively. As in the means 10 of FIG. 1, application of the radiation curable material 31 to surfaces of the electrode foils 33 and 33' is accomplished by removing lengths of electrode foil from electrode foil rolls 34 and 34' respectively. Rolls 34 and 34' are suitably carried by arbors 35 and 35' respectively. Lengths of electrode foil 33 and 33' to be treated are guided by a series of rollers 36 and 36' in baths 32 and 32'. The electrode foils 33 and 33' are immersed in the radiation curable polymeric material 31 for the required length of time to apply desired amounts of material to immersed surfaces of the electrode foil 33 and 33'.

Electrode foils 33 and 33' are withdrawn from baths 32 and 32' and together with the radiation curable material applied to their surfaces are passed through radiation cross-linking or curing zone 38 and 38' respectively. Zones 38 and 38' include ultraviolet light source 39 and 39' respectively for causing cross-linking or curing of the material 31 applied to the surfaces of the foil electrodes 33 and 33' respectively.

Electrode foils 33 and 33' with their cured material 31 are guided by a series of rollers 40 and 40' through bath 43 and 43' respectively. Baths 43 and 43' contain liquid electrolyte 44. The electrode foils 33 and 33' with their cured polymer material 33 and 33' are immersed in the electrolyte 44. Electrolyte 44 is retained by the cured material 33 and 33'.

The combination of the electrode foils 33 and 33' and the cured polymer material containing electrolyte are convolutely wound into a convolutely wound body 48 on arbor 47. Convolutely wound body 48 includes a pair of electrode foils, cured polymer material associated with each electrode foil and electrolyte and, is suitable for use as a capacitor body in an electrolytic capacitor.

The polymeric material 31 used for application to the surfaces of electrode foils 33 and 33' is similar to that used in FIG. 1.

The following example is typical of electrode foils 13, 33 and 33' treated using means 11 and 30 of FIGS. 1 and 2 respectively.

EXAMPLE

Ultraviolet light cross-linkable or curable material 11 marketed by W. R. GRACE & CO. under the type designation 5261A is placed in bath 12 to the desired level. Etched electrode foil 13, such as dielectric oxide film-forming Al, Ta, Nb, Ti, Zr or the like having a dielectric oxide film formed over its surfaces and having a total thickness of about 0.0008 to about 0.004 of an inch and a width of about 2 to about 18 inches, is dispensed from roll 14 at the rate of about 1 inch per second and immersed in polymer material 11 for about 1 to about 3 seconds. Electrode foil 13 with applied polymer material 11 is withdrawn from the bath 12 and radiated by ultraviolet light having a wavelength of about 3600 to about 3700 Angstrom (A) for about 0.5 to about 1 second. The exposure of the polymer material 11 to the ultraviolet light causes what appears to be an almost instantaneous cross-linking or curing of the polymer and provides the electrode foil 13 with a substantially uniform and continuous layer (not shown in FIG. 1) having a thickness of about 0.002 inches. The layer is relatively clear and has a good electrolyte retention characteristic. The electrode foil 13 with its cured polymer layer is immersed in an electrolyte of ammonium borate, boric acid and glycol for about 1 to about 3 seconds. The electrode foil 13 with its cured polymer layer and retained electrolyte is convolutely wound with another etched foil electrode, that may or may not include a dielectric oxide film over its surface and a cured polymer layer with retained electrolyte, to thereby provide a convolutely wound capacitor body suitable for use in an electrolytic capacitor.

Another embodiment of the present invention is illustrated in FIG. 3. A means 50 is shown for applying and curing radiation curable material 51 from baths 52 and 52' to filler materials of dielectric material 53 and 53'. Preferably the filler material is a thin flat material of closely matted fibers such as paper or cloth, and most preferably, Kraft paper. The application of the radiation curable material 51 to surfaces of paper fillers 53 and 53' is accomplished by removing lengths of the paper from paper rolls 54 and 54'. Paper rolls 54 and 54' are suitably carried by arbors 55 and 55' respectively. Papers 53 and 53' to be treated are guided by rollers 56 and 56' respectively through baths 52 and 52' respectively. Papers 53 and 53' are then immersed in the radiation curable polymeric material 51 for the required length of time to apply desired amounts of material to immersed surfaces of the papers 53 and 53'.

The papers 53 and 53' are withdrawn from baths 52 and 52' and each together with the radiation curable material applied to their surfaces are passed through radiation cross-linking or curing zones 58 and 58' respectively. The curing zones include ultraviolet light source 59 and 59' respectively for causing cross-linking or curing of the material 51 applied to the surfaces of the papers 53 and 53' respectively.

Papers 53 and 53' with cured material 51 are guided by rollers 60 and 60' respectively in baths 63 and 63' respectively. Baths 63 and 63' contain liquid electrolyte 64. The papers 53 and 53' with their cured polymer material are immersed in the electrolyte 64. Electrolyte 64 is retained by the cured material 51.

The combination of the electrolyte foils 53 and 53' and the cured polymer material retaining electrolyte is convolutely wound with etched aluminum foil 65 and 65' dispensed from foil roll 66 and 66' carried by arbor 67 and 67' respectively to form a convolutely wound body 68. A convolutely wound body 68, which includes a pair of paper strips, cured polymer material and electrolyte, and a pair of etched aluminum foil strips, is suitable for use as a capacitor body in an electrolytic capacitor.

FIG. 4 is a 200 magnification cross-sectional view of an etched aluminum foil strip 40 having a thickness of about 0.002 of an inch with opposite surfaces covered by a dielectric oxide film 41 and 42 of aluminum. The dielectric oxide film 41 of aluminum of the aluminum foil strip 40 is covered by a substantially continuous film of ultraviolet light cured polymer material 5261A marketed by W. R. GRACE & CO. The polymer material is indicated by reference number 43 and has a thickness of about 0.002 of an inch. An electrolyte of ammonium borate, boric acid and glycol is retained by the polymer material 43. Note that the polymer material 43 retains the electrolyte in a manner that appears to physically disappear to the human eye at 200 magnifications.

The construction of a convolutely wound capacitor body of the type illustrated in FIG. 1 but without immersing the applied, cured polymer material in the ammonium borate, boric acid and glycol electrolyte exhibited an unacceptable capacitance value. A capacitor body of the type illustrated in FIG. 1 wherein the cured polymer material retained electrolyte exhibited an acceptable capacitance value.

The concepts of the present invention appear to be applicable to battery bodies as well as to capacitor bodies. The capacitor body may be a convolutely wound capacitor body of the type discussed hereinbefore as well as a stacked foil type capacitor body. The stacked foil type capacitor body includes a plurality of flat alternate anode and cathode foil electrodes separated by cured polymeric material retaining electrolyte.

I claim:

1. In combination an electrode and a polymer containing material for an electrical device, the electrode including metal containing material, the polymer containing material contiguous to the electrode, the polymer containing material at least semi-cured by radiation and retaining electrolyte.

2. The combination of claim 1, wherein the polymer containing material further includes a dielectric filler.

3. The combination of claim 2, wherein the filler is paper.

4. The combination of claim 1, wherein an etched surface of the electrode is contiguous to the polymer containing material.

5. The combination of claim 1, wherein the electrode includes a dielectric oxide film of a film-forming metal contiguous to the polymer containing material.

6. A capacitor including the combination of the electrode and the polymer containing material retaining electrolyte of claim 1.

7. The capacitor of claim 6, wherein the electrode is the cathode electrode of the capacitor.

8. A capacitor including the combination of the electrode and the polymer containing material retaining electrolyte of claim 1 convolutely wound with another electrode to provide a capacitor body.

9. The capacitor of claim 8, wherein the other electrode includes a metal containing material and a polymer containing material contiguous to the other electrode, the polymer containing material at least semi-cured by radiation and retaining electrolyte.

10. A method of making the combination of claim 1, the method comprising the steps of applying radiation curable polymer containing material to a metal containing electrode, irradiating the applied polymer containing material to at least semi-cure the applied polymer containing material, and treating the polymer containing material to cause the polymer containing material to retain electrolyte.

11. A method of making the combination of claim 2, the method comprising the steps of applying radiation curable polymer containing material to a dielectric filler material, irradiating the applied polymer containing material to at least semi-cure the applied polymer containing material, treating the polymer containing material to cause the polymer containing material to retain electrolyte, and placing the polymer containing material retaining electrolyte contiguous to an electrode.

* * * * *